Aug. 5, 1930.   I. M. KOSINETZ   1,772,316
BAND TRACTOR
Filed Aug. 1, 1929   2 Sheets-Sheet 1
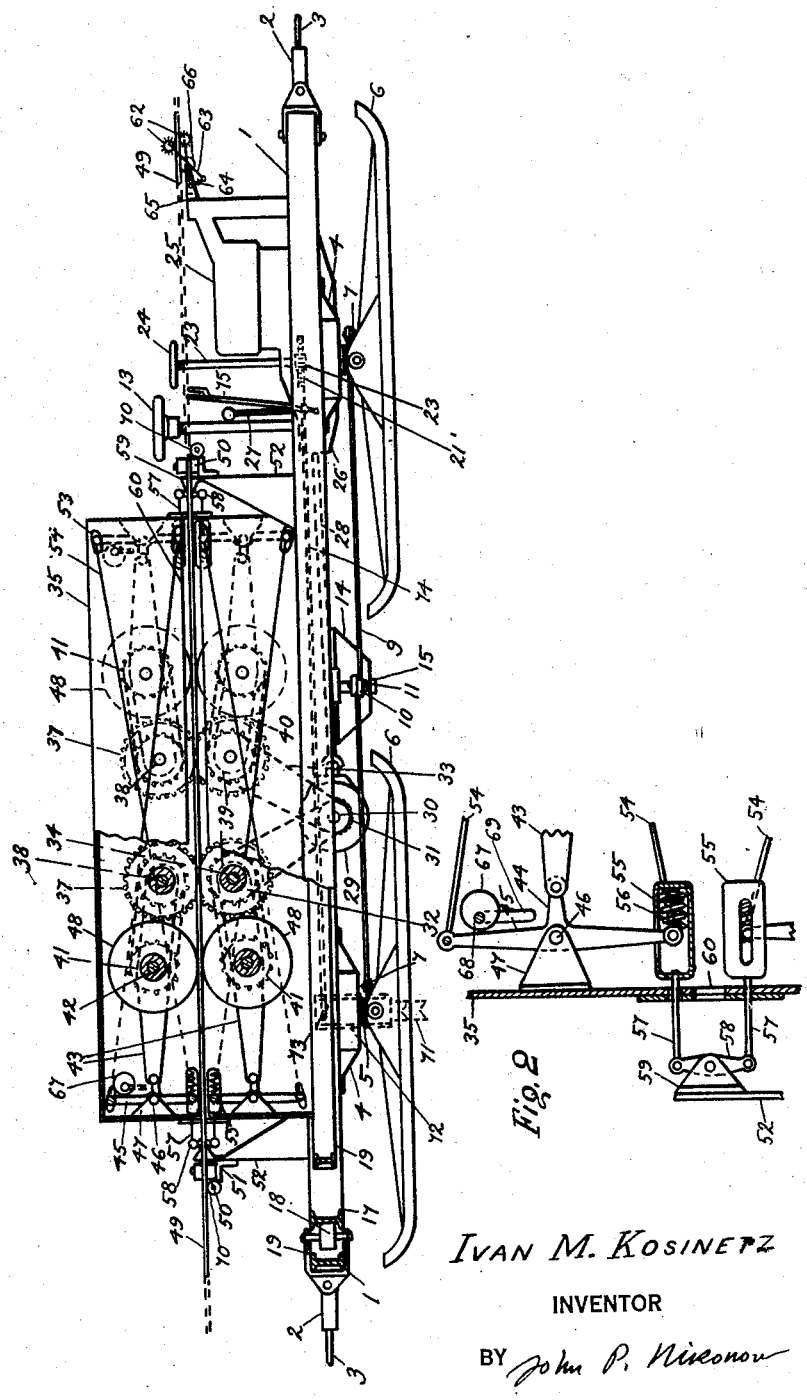
IVAN M. KOSINETZ
INVENTOR
BY John P. Nixonov
ATTORNEY

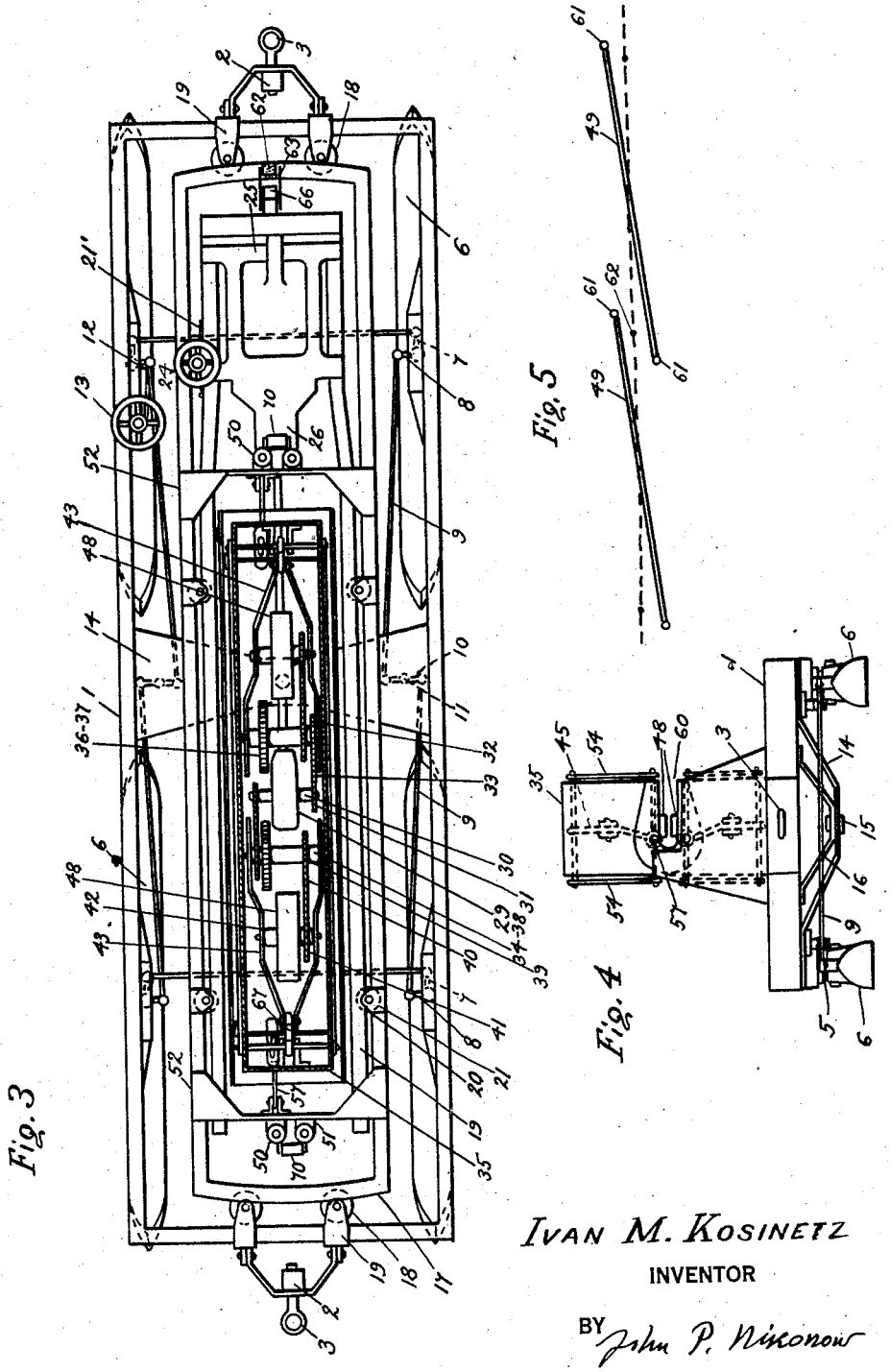

Patented Aug. 5, 1930

1,772,316

UNITED STATES PATENT OFFICE

IVAN M. KOSINETZ, OF MOSCOW, UNION OF SOCIALIST SOVIET REPUBLICS

BAND TRACTOR

Application filed August 1, 1929, Serial No. 382,633, and in Germany February 25, 1929.

My invention relates to band tractors and has a particular reference to tractors or self propelled vehicles adapted to move along a steel band or a similar flexible carrier.

The object of my invention is to provide a self propelled vehicle which can travel over snow, ice, swampy ground or any other surface which may be unsuitable for ordinary vehicles. Such ground usually offers very little tractive cohesion, and the tractive wheels of trucks or tractors of ordinary design only dig themselves into the loose material of snow or sand, for instance, or slip on the ice.

My band tractor has no driving wheels touching the ground and is provided instead with skis (for snow) or such wheels as will support its weight on the ground over which it will travel. The tractive effort is wholly transmitted to a stationary steel band stretched between two points a few miles apart. The tractor is adapted to engage this band between friction wheels operated by a suitable engine or motor, thereby propelling itself from one end of the band to the other. At the end of the first band a second band is located, overlapping it so as to enable the tractor to be easily transferred from one band to the other.

My invention is more fully described in the accompanying specification and drawing in which—

Fig. 1 is a side elevation of my tractor partly in section, Fig. 2 is a detailed partial view of the tension mechanism, Fig. 3 is a plan view partly in section, Fig. 4 is an end view, and Fig. 5 is a diagrammatic view of the steel bands on the ground.

My band tractor consists of an outer or main frame 1 with drawbars 2 on the ends. The drawbars are provided with couplings 3 in the form of eyes, hooks, etc.

Supporting blocks 4 are attached to the frame 1 underneath for pivots 5 on which skis 6 are rotatively mounted. The skis are provided with longitudinal (7) and transverse (8) lugs pivotally connected with rods or links 9. The other ends of these rods are pivoted to the ends of arms 10 pivoted centrally on pins 11 attached to the frame 1.

One of the front skis has an additional lug 12 connected with a steering gear of a steering wheel 13. This arrangement enables the rear skis to be turned in the opposite direction with the front skis so that they will follow the same path on the curves.

A suitable driver's seat (not shown) can be attached to the frame 1 near the steering post.

A cross piece 14 is attached to the frame 1 in the middle. It supports a pivot 15 on which a cross piece 16 of the intermediate inner frame 17 is rotatively mounted. The ends of the frame 17 are bent on the arcs of a circle having for its center the pivot 15. The ends are provided with flanges (being made, for instance, of I-beams) and are engaged by rollers 18 supported on brackets 19 attached to the ends of the main frame 1.

With this arrangement the frame 17 can rotate inside of the frame 1 on the pivot 15 and on the rollers 18, the amount of the rotative movement being determined or limited by the relative width of the frames 1 and 17.

A third or inner frame 19 is placed inside of the intermediate frame 17 and is supported on rollers 20 rotatively mounted in brackets 21 attached to the sides of the frame 17. This frame 19 is provided with a rack 21' engaged by a pinion 22 on the end of a vertical shaft 23 with a handwheel 24. By turning this handwheel the frame 19 can be moved longitudinally inside of the frame 17.

An engine 25 is mounted on the frame 19 and is connected with a gear box 26 with a gear shift lever 27 and a driving shaft 28. This power unit may be of any ordinary construction of a type used on automobiles or tractors.

The driving shaft 28 is connected with a differential gear 29 with shafts 30 on which sprockets 31 are mounted. These sprockets are connected with sprockets 32 by means of chains 33. The sprockets 31 are mounted on shafts 34 rotatively supported in bearings in the walls of a central housing 35 which is supported on the inner frame 19. Spur gears 36 are also mounted on the shafts 34 and are in mesh with upper gears 37 on upper shafts 38. The shafts 34 and 38 are also provided with sprockets 39 connected by means of chains 40 with sprockets 41 on shafts 42. These shafts 42 are rotatively mounted in swinging brackets or arms 43 rotatively mounted on shafts 34 and 38 with their ends. The other ends of these arms are pivotally connected with arms 44 of levers 45. These levers are rotatively mounted on pivots 46 supported by brackets 47 attached to the end walls of the housing 35. Friction or driving wheels 48 are mounted on the shafts 42. A driving band or strip 49 is placed between the driving wheels 48 and is guided by rollers 50 rotatively supported on brackets 51 attached to cross members 52 supported on the frame 17.

The ends of the vertical arms of the levers 45 are provided with cross members or bars extending on both sides outside of the housing 35 through elongated apertures 53. The ends of these bars are pivotally connected with the ends of tension rods 54, the rods being crossed in the middle, connecting upper and lower arms respectively of the levers 45.

The lower ends of the upper levers and the upper ends of the lower levers 45 are placed in tubular members 55 located near the walls of the housing 35. Compression springs 56 are placed in these tubular members back of the ends of the lever arms. Rods 57 extend from the ends of the members 55 to the outside of the housing 35 and are pivotally connected with the ends of levers 58 pivotally supported on brackets 59 attached to cross members 52.

The housing 35 is provided with an open slot 60 on one side through which the band 49 is inserted. This band is made of steel of a sufficient thickness and width to withstand the pull of the tractor under full load. It is made of a convenient length, for instance, three miles. It is laid on the ground and is fastened with its ends to stationary supports or poles 61 (Fig. 5) at the height corresponding to the height of the slot 60 above the ground. The next band is placed as shown, overlapping with its beginning the end of the first one, in a direction at an angle with the direction of movement of the tractor which is shown with dotted lines in Fig. 5.

Instead of the steel strip a flat chain or other suitable flexible member may be used.

The operation of my device is as follows.

The tractor is placed at the beginning of the first band which is inserted in the slot 60 between the driving wheels 48 and between the guiding rollers 50.

With the neutral position of the frame 19 on the frame 1, as shown in Fig. 1, the wheels 48 do not exert any pressure on the band. By turning the handwheel 24 the frame 19 is displaced in relation to the frame 1, sliding on the rollers 20. If the frame 19 is moved forward, then the springs 56 begin to press against the ends of the arms 45 thereby turning the levers 44 and depressing the ends of the arms 43 with the wheels 48 against the band 49. The band then becomes clamped between the rear wheels 48.

The turning movement of the levers 44 also displaces the rods 54. These rods being crossed as shown, they will turn the front levers 44 in the opposite direction to the movement of the rear levers, thereby bringing together the front wheels 48 and clamping them also against the band 49.

The rotation of the engine shaft is transmitted to the driving wheels 48 from the differential 29 through sprockets 31, 32, 39 and 41, chains 33 and 40 and gears 36 and 37. The upper and lower wheels 48 rotate in the opposite directions, thereby propelling the vehicle along the band.

The pressure of the wheels 48 on the band 49 is regulated by the tension of the springs 56. If a deflection Y is required for a maximum pressure X of the wheels 48 on the band, then each spring must be compressed to a distance of Y/2. The total travel or displacement of the frame 19 from its neutral position must be therefore equal to Y: one half of this distance for the compression of the springs, and the other half for the free movement from the neutral position. The size of the slots in the members 55 is so proportioned, that after passing the distance Y, the arms 45 on the opposite end of the housing 35 will bear against the edges of the slots, thereby relieving the pressure on the wheels 48.

This arrangement prevents the exertion of an excessive pressure on the wheels 48, which is important in order to prevent the breakage of the band under sudden application of a heavy load, or when the movement is irregular, with jerks and jolts.

The rotative mounting of the inner frame 17 in relation to the main frame makes it possible to guide the skis or runners 6 along the straight path, indicated with a dotted line in Fig. 5, while the inner frame with the wheels 48, clamping the band 49, follows the latter in a direction, slightly diagonal to the path of the tractor. The ends of the successive bands 49 overlap each other, as shown in Fig. 5. This enables the operator at this point to disconnect the tractor from one band and connect it to the other, in order to start the trip along the next band.

The runners 6 can be turned so as to follow a curved path if necessary. Ordinary wheels can be used instead of the runners, if the vehicle must be adapted for a solid ground, ice etc. No spikes on the wheels or spurs of any kind are required, as the wheels do not furnish any of the tractive effort, and merely serve to support the vehicle.

In order to clean the band 49 from dirt, snow etc., rotary cylindrical brushes 62 are provided in front of the tractor, supported on hinged arms 63. They are drawn together by means of a spring 64 and are pivotally mounted on a bracket 65. The band 49 is supported on a horizontal guiding roller 66. This roller is connected by chains or gears with brush rollers 62. The pressure of the band 49 on the roller 66 causes the latter to rotate, thereby rotating the brushes 62 and cleaning the upper and lower surfaces of the band. A similar cleaning device is placed at the rear of the tractor (which is not shown on the drawing) in order to clean the band if the tractor moves backwards.

In order to facilitate the insertion of the band 49 between the driving wheels 48, the latter are moved away from the band by means of eccentrics 67 mounted on shafts 68 which are journaled in the walls of the housing 35. The shafts may be turned by handles 69 thereby causing the eccentrics 67 to press against the arms 45. It is sufficient to operate one eccentric at a time as the movement is transmitted to all four arms 45 through drag links 54, moving brackets 43 with the wheels 48 away from the band.

Additional horizontal guiding rollers 70 can be placed in front of the vertical rollers 50.

The speed of the truck is regulated by controlling the speed of the engine. If it is desired to retard the speed, then the fuel or the spark can be cut off, and the transmission is connected on second or first gear, in the same manner as it is done in driving ordinary tractors or automobiles. The braking effort in this case is transmitted to the band. For this purpose an ordinary foot brake can be also used acting on a brake drum on the transmission shaft 28, of an ordinary construction.

In order to relieve the band from the strain, I have also provided additional brakes in the form of sliding cylinders 71 with sharp corners which can be pushed under the skis 6 so as to grip the road. These cylinders are mounted on sliding frames 72 with can shaped apertures on top for pins 73 on the ends of rods 74 operated by a lever 75. The frames 72 are supported in brackets 4, and the skis are provided with large clearances for them.

Important advantages of my tractor are that it can be used for maintaining regular schedules of travel over a difficult country, without graded or paved roads, sandy, swampy, or covered with a deep snow in winter. It is simple and convenient to control and has an automatic pressure regulation for the driving wheels which prevents the breakage of the flexible carrier engaged by these wheels.

I claim as my invention:

1. In a band tractor, the combination with a frame, of means to slidably support said frame on the ground, an engine on said frame, a stationary flexible cable, a plurality of wheels on said frame adapted to engage said flexible cable, means to rotate said wheels by said engine thereby transmitting a tractive effort to said flexible cable, and an automatic means to limit said tractive effort.

2. In a band tractor, the combination with a frame, of means to slidably support said frame on the ground, means to steer said slidable supports, an engine on said frame, a stationary flexible cable, a plurality of wheels on said frame, means to press said wheels against said flexible cable, an automatic means to limit said pressure, operative connections between said engine and said wheels, and means to manually control said operative connections.

3. In a band tractor, the combination with an outer frame, of means to slidably support said frame on the ground, an inner frame slidably supported in said outer frame, a housing on said inner frame, a plurality of wheels in said housing, an engine on said inner frame, operative connections between said engine and said wheels, a stationary flexible cable, means to support the ends of said cable above the ground, means to guide said cable in said frame between said wheels, movable brackets supporting said wheels, flexible connections between said movable brackets and said outer frame, and means to move said inner frame in relation to said outer frame thereby moving said brackets with said wheels and controlling the operative connections between said wheels and said flexible cable.

4. In a band tractor, the combination with an outer frame, of means to slidably support said frame on the ground, an inner frame slidably supported in said outer frame, a housing on said inner frame, a plurality of wheels in said housing, an engine on said inner frame, operative connections between said engine and said wheels, a stationary flexible cable, means to support the ends of said cable above the ground, means to guide said carrier in said frame between said wheels, means to clamp said wheels against said flexible carrier, means to control said clamping means by the movement of said inner frame in relation to said outer frame, and means to limit the pressure of said wheels on said flexible cable.

5. In a band tractor, the combination with an outer frame, of means to slidably support said frame on the ground, an intermediate frame rotatively mounted on said outer frame, an inner frame slidably mounted in said intermediate frame, an engine on said inner frame, a housing on said inner frame, a plurality of wheels in said housing, operating connections between said engine and said wheels, a stationary band, means to clamp said wheels against said band, operating connections between said clamping means and said intermediate frame, and means to move said inner frame in relation to said intermediate frame thereby rendering said wheel clamping means operative.

6. In a band tractor, the combination with a frame, of means to slidably support said frame on the ground, a steering mechanism for said supporting means, a housing inside of said frame, a stationary flexible band, a plurality of pairs of wheels in said housing, an engine on said frame, operative connections between said engine and said wheels, a manually controlled means to clamp said band between said pairs of wheels, and means to equalize the pressure of said wheels on said band.

In testimony whereof I affix my signature.

IVAN M. KOSINETZ.